Figure 1:
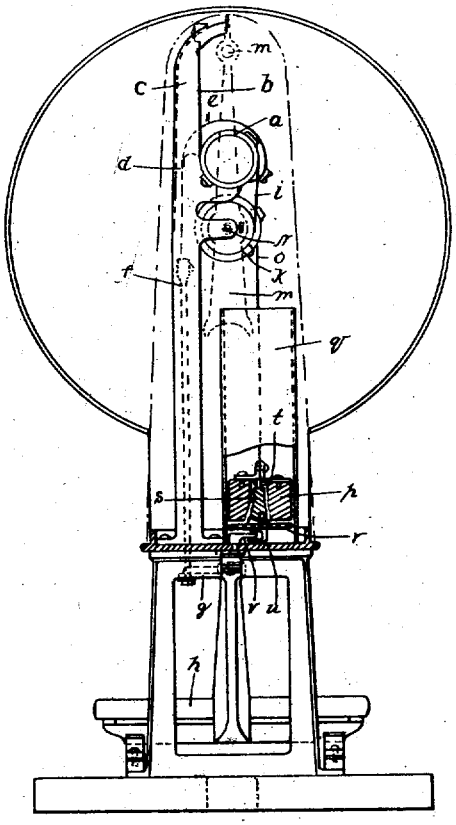

E. G. HEDMAN.

AUTOMATIC WEIGHING APPARATUS.

APPLICATION FILED DEC. 12, 1912.

Reissued Aug. 26, 1913.

13,609.

2 SHEETS—SHEET 1.

Witnesses
W. L. Ford
W. H. Wilknap

Inventor
Erik Gustaf Hedman
By Whittemore Hulbert & Whittemore
Attys

E. G. HEDMAN.

AUTOMATIC WEIGHING APPARATUS.

APPLICATION FILED DEC. 12, 1912.

Reissued Aug. 26. 1913.

13,609.

2 SHEETS—SHEET 2.

Witnesses
H. L. Ford
H. B. Bilkins

Inventor
Erik Gustaf Hedman
By Whittemore Hulbert & Whittemore
attys

UNITED STATES PATENT OFFICE.

ERIK GUSTAF HEDMAN, OF STOCKHOLM, SWEDEN.

AUTOMATIC WEIGHING APPARATUS.

13,609. Specification of Reissued Letters Patent. Reissued Aug. 26, 1913.

Original No. 1,015,561, dated January 23, 1912, Serial No. 611,482. Application for reissue filed December 12, 1912. Serial No. 736,418.

*To all whom it may concern:*

Be it known that I, ERIK GUSTAF HEDMAN, a subject of the King of Sweden, and residing at 46 Kungsholmsgatan, Stockholm, Sweden, have invented certain new and useful Improvements in Automatic Weighing Apparatus, of which the following is a specification.

The present invention relates to an arrangement in so called roller balances *i. e.* weighing apparatus having one or more rollers or so-called rolling members suspended in bands or the like adapted to wind themselves on the rolling member, when bands or the like connected thereto are actuated by the load. By this action the rolling member not only turns but as known, also moves in a direction at right angles to its axis. The latter movement has made it difficult to insure satisfactory indication by means of a pointer or other indicator.

One object of the invention is to insure the movement of the indicating mechanism in a convenient and reliable manner and preferably also to insure a large indicating movement.

The invention is characterized as to one feature thereof by the provision besides the said rolling member or members of another roller (which I term the indicating roller) connected to the pointer or indicating mechanism of the weighing apparatus, said latter roller being suitably placed below or above the rolling member and connected thereto suitably by winding bands or other flexible connectors, but it might be placed at the side of the rolling member.

In order that the indicating roller shall not be exposed to lateral strains and thus not exposed to friction in the bearings or the like by which it might have a disturbing action on the turning force, the roller is suitably balanced in its turning movement by being provided with one or more band paths concentric with the roller, such band paths being of larger diameter than the paths on such roller for the bands from the rolling member, and said band paths of larger diameter having attached to them bands or the like which carrying the counterweight of the weighing apparatus, exert a turning action on the indicating roller in a direction opposite to that in which it is turned by the rolling member. The turning moments acting at the indicating roller thus always balance one another and the indicating roller will be practically freely suspended. To insure, however, that the axis of the indicating roller will be maintained in a constant position, it is suitably centered in relation to the frame but in effect no weight is transmitted through the axis.

The invention is further characterized by the arrangements which are hereinafter more particularly described with reference to the accompanying drawings, which show a form of embodiment of the invention.

Figure 2:
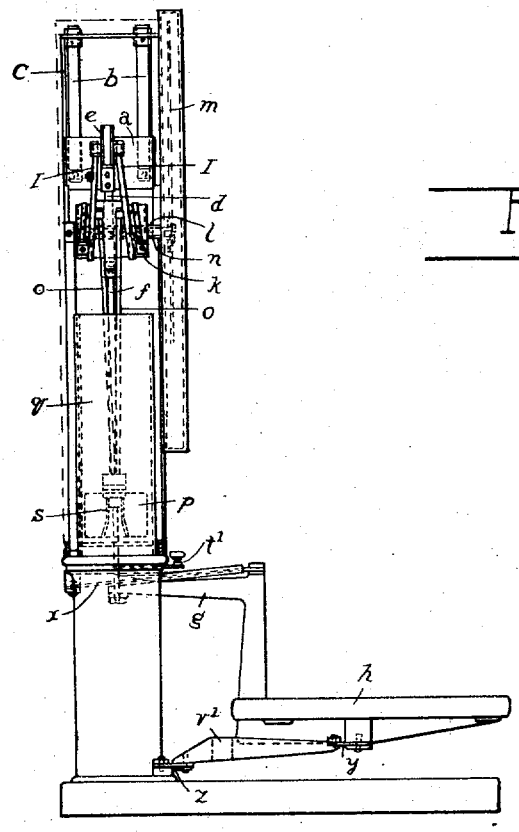

Figure 1 is a rear view and partial section of a weighing apparatus arranged according to the invention, and Fig. 2 is a side elevation of the weighing apparatus viewed from the side.

*a* is the rolling member and *b* are the supporting bands connected thereto, said bands being attached to the upper part of the frame *c*, *d* is the load band of the weighing apparatus which runs on the path *e*, of the spiral or volute form shown, of the rolling member *a* and leads to a rod *f* connected to an arm *g* carrying the weighing scales *h*. Connected to the rolling member *a* are two bands *i* which tend to turn the roller member *a* in the direction in which the bands *b* tend to turn it. The bands *i* are connected to the indicating roller *k* which is firmly connected to a tube or the like *l* one end of which carries the pointer *m*. Extending through the other end of the tube is a needle-like axle *n* attached to the frame *c*, which axle, however, does not in effect carry the weight of the indicating roller or resist any strain but merely forms a pivot for the roller. Bands *o* are connected to the indicating roller in such a manner that they tend to turn the same in a direction opposite to that in which the bands *i* tend to turn it. The bands *o* are connected to and carry the counterweight *p* of the weighing apparatus.

The arrangement hereinbefore described acts in such a manner that, when the weighing apparatus is loaded and a pull is thereby exerted on the load bank *d*, the rolling member *a* is turned and at the same time rises by rolling up the bands *b* and thereby winding the bands *b* thereon. The rolling member thereby exerts a pulling action on the bands *i* and turns the indicating roller $k$ so that the pointer turns, said movement being in proportion to the sum of the turning movement and vertical movement of the rolling member but the axis of the pointer remaining constantly in the same position. According to the form of embodiment shown the paths for the bands $i$ on the rolling member and on the indicating roller are of the same diameter and the indicating roller therefore, owing to the fact that the rolling member rises as it rolls up the bands $b$, revolves at twice the rate of the rolling member. By choosing the ratio between the diameters of the rolling and indicating members as desired the pointer may obviously be caused to turn still faster or slower than the rolling member. It should here be explained that the weight of the indicating roller $k$ and the diameters of the paths on such roller for the bands $i$ and $o$ respectively are so related that regarding the points where the bands $i$ first touch the roller as being a fulcrum the moment of the weight of the roller at one side of the fulcrum balances the pull of the bands $o$ thus substantially relieving the center pin of the roller $k$ of all strain.

The counterweight $p$ of the weighing apparatus is movable up and down in a stationary tube $q$ as shown in the drawings. This tube not only forms a reliable guide for the weight but also serves for checking or steadying the movements of the weighing apparatus thereby avoiding undue oscillation and bringing the moving parts quickly to rest. For this purpose the weight $p$ has loosely suspended from a point therein a piston $r$ the edge of which is slightly rounded and this piston is just sufficiently less in diameter than the tube $q$ to allow air to pass from one side of the piston to the other. The tube is closed at the bottom and the movement of the weight $p$ and the piston $r$ within the tube will thus be obstructed by the fact that air must squeeze past the edge of the piston when the weight moves whether the movement takes place in consequence of the weighing apparatus being loaded or whether the weighing apparatus has just been unloaded, the weight is immediately checked. The yielding connection between the weight $p$ and the piston $r$ is obtained, as shown in the drawings, by a pin-like part $s$ which projects upwardly from the piston into a corresponding spacious cavity in the weight which has a hook, pin or the like $t$ on which the part $s$ is loosely hung so as to be able to swing freely with the piston in relation to the weight. For locking the weighing apparatus a handle $t'$ rigid with an arm $v$ which is adapted to be turned in the frame is provided said arm being adapted to be turned into engagement with a hook $u$ of the weight so that the weight cannot be moved upward.

In order to provide easy working and simplicity in the movement of the scale $h$ flexible spring bands $x$, $y$, $z$ are placed in the joints between the arm $g$ and the frame of the weighing apparatus as well as between the scale and its supporting bar $v'$ but other suitable joints may be provided.

Having fully described my invention, what I claim and desire to secure by Letters Patent, is:—

1. In a weighing apparatus, a load-carrying roller, a flexible connector which transmits the pull of the load to the load-carrying roller, a supporting flexible connector along which the load-carrying roller rolls as it is turned by the load, a support for carrying said supporting flexible connector, indicating-mechanism, a roller to actuate said mechanism, a flexible connector attached to the circumference of the load-carrying roller and passing around the periphery of the indicating-mechanism actuating-roller and turning such roller from the load-carrying roller, and means by which the indicating-mechanism actuating-roller is caused to turn back again on the return movement of the load-carrying roller.

2. In a weighing apparatus, a load-carrying roller, a flexible connector which transmits the pull of the load to the load-carrying roller, a supporting flexible connector along which the load-carrying roller rolls as it is turned by the load, a support for carrying said supporting flexible connector, indicating-mechanism, a roller to actuate said mechanism, a flexible connector attached to the circumference of the load-carrying roller and passing around the periphery of the indicating-mechanism actuating-roller and turning such roller from the load-carrying roller, means by which the indicating-mechanism actuating-roller is caused to turn back again on the return movement of the load-carrying roller, and means by which the axis of the indicating-mechanism actuating-roller is maintained in a constant position.

3. In a weighing apparatus, a load-carrying roller, a flexible connector which transmits the pull of the load to a load-carrying roller, a supporting flexible connector along which the load-carrying roller rolls as it is turned by the load, a support for carrying said supporting flexible connector, indicating-mechanism, a roller to actuate said mechanism, a flexible connector attached to the circumference of the load-carrying roller and passing around the periphery of the indicating-mechanism actuating-roller and turning such roller from the load-carrying roller, a second flexible connector and means by which it is suspended from the periphery of the indicating-mechanism actuating-roller, said connector carrying a counterweight and pulling such roller in a direction tending to revolve it in the opposite direction to that in which it is turned from the load-carrying roller.

4. In a weighing apparatus, a load-carrying roller, a flexible connector which transmits the pull of the load to the load-carrying roller, a supporting flexible connector along which the load-carrying roller rolls as it is turned by the load, a support for carrying said supporting flexible connector, indicating-mechanism, a roller to actuate said mechanism, a flexible connector attached to the circumference of the load-carrying roller and passing around the periphery of the indicating-mechanism actuating-roller and turning such roller from the load-carrying roller, a second flexible connector, means by which it is suspended from the periphery of the indicating-mechanism actuating-roller said connector carrying a counterweight and pulling such roller in a direction tending to revolve it in the opposite direction to that in which it is turned from the load-carrying roller, the pull of the counterweight acting upon the indicating-mechanism actuating-roller at a point farther from the axis of the roller than the point at which the load-carrying roller acts upon the indicating-mechanism actuating-roller and balancing the weight of the latter roller about the point at which the load-carrying roller acts thereupon whereby the axis of the indicating-mechanism actuating-roller tends to remain stationary and the weight of such roller and of the counterweight to be carried entirely by the load-carrying roller.

5. In a weighing apparatus, a load-carrying roller, a flexible connector which transmits the pull of the load to the load-carrying roller, a supporting flexible connector along which the load-carrying roller rolls as it is turned by the load, a support for carrying said supporting flexible connector, indicating-mechanism, a roller to actuate said mechanism, a flexible connector attached to the circumference of the load-carrying roller and passing around the periphery of the indicating-mechanism actuating-roller and turning such roller from the load-carrying roller, a second flexible connector, means by which it is suspended from the periphery of the indicating-mechanism actuating-roller said connector carrying a counterweight and pulling such roller in a direction tending to revolve it in the opposite direction to that in which it is turned from the load-carrying roller, the pull of the counterweight acting upon the indicating-mechanism actuating-roller at a point farther from the axis of the roller than the point at which the load-carrying roller acts upon the indicating-mechanism actuating-roller and balancing the weight of the latter roller about the point at which the load-carrying roller acts thereupon, whereby the axis of the indicating-mechanism actuating roller tends to remain stationary, and the weight of such roller and of the counterweight to be carried entirely by the load-carrying roller, and a pin which passes through the indicating-mechanism actuating-roller to insure that the axis of such roller will remain in a constant position.

6. In a weighing apparatus, an indicating-mechanism actuating-roller, a flexible connector passing around the periphery of the indicating-mechanism actuating-roller to turn such roller, means whereby said connector is actuated by the load, a second flexible connector, means by which it is suspended from the indicating-mechanism actuating-roller, said connector carrying a counterweight and pulling such roller in a direction tending to revolve it in the opposite direction to that in which it is turned by the flexible connector actuated by the load, the pull of the counterweight acting upon the indicating-mechanism actuating-roller at a point farther from the axis of the roller than the point at which the load-actuated connector acts upon the indicating-mechanism actuating-roller and balancing the weight of the latter roller about the point at which the load-actuated connector acts thereupon in different positions of adjustment, whereby the axis of the indicating-mechanism actuating-roller tends to remain stationary and the weight of such roller and of the counterweight to be carried entirely by the load-actuated connector.

7. In a weighing apparatus, a flexible connector, means whereby said connector is variably actuated in proportion to the load, an indicating-mechanism actuating-roller having peripheral portions at different distances from the axis thereof, said flexible connector passing around the portion nearest the axis and being attached to said roller, a second flexible connector attached to said roller passing in the opposite direction around the peripheral portion farthest from the axis and extending downward, and means for exerting a tension on the latter connector, counterbalancing the tendency of the indicating-mechanism actuating-roller to move downward in different positions of rotation of the latter.

8. In a weighing apparatus, an indicating mechanism including a roller rotatable about a substantially fixed axis, a connector operatively attached to said roller to turn the same in one direction, means whereby said connector is actuated by the load, and means acting upon the roller in a direction and with a force predetermined to produce a balancing of the roller about its axis in different positions of rotative adjustment whereby the roller will be practically freely suspended.

9. In a weighing apparatus, an indicating mechanism including a roller rotatable about a fixed axis and having bearing portions at different distances from said axis, a flexible connector operatively connected to one of said bearing portions, means whereby said connector is variably actuated in proportion to the load, a second flexible connector operatively attached to the other of said bearing portions, and means for exerting a predetermined tension on the latter connector to counter-balance the tendency of the pivoted member to move downward in different positions of rotation of the latter.

10. In a weighing apparatus, an indicating mechanism including a roller having portions provided with curved bearing surfaces at different distances from the axis of said pivoted member, a flexible connector operatively connected to said roller and passing over one of said bearing portions, means whereby said flexible connector is variably actuated in proportion to the load, a second flexible connector operatively attached to said roller and passing over the other of said bearing portions, and means for exerting a tension on the latter connector to counterbalance the tendency of the pivoted roll to move downward in different positions of rotation of the latter.

In testimony whereof I affix my signature in presence of two witnesses.

ERIK GUSTAF HEDMAN.

Witnesses:

ALICE E. ANDERSON,

C. EINAR ANDERSON.